July 23, 1968 W. A. LLOYD 3,394,383

ELECTROGRAPHIC RECORDER EMPLOYING AN ARRAY OF WRITING ELECTRODES AND AN ANALOG-TO-DIGITAL CONVERTER FOR ENERGIZING SAME

Filed Sept. 28, 1966 2 Sheets-Sheet 1

INVENTOR.
WILLIAM A. LLOYD

BY Wm J Nolan

ATTORNEY

INVENTOR.
WILLIAM A. LLOYD
BY [signature]
ATTORNEY

United States Patent Office 3,394,383

Patented July 23, 1968

3,394,383

ELECTROGRAPHIC RECORDER EMPLOYING AN ARRAY OF WRITING ELECTRODES AND AN ANALOG-TO-DIGITAL CONVERTER FOR ENERGIZING SAME

William A. Lloyd, San Jose, Calif., assignor to Varian Associates, Palo Alto, Calif., a corporation of California Filed Sept. 28, 1966, Ser. No. 582,767

6 Claims. (Cl. 346—32)

ABSTRACT OF THE DISCLOSURE

An electrographic recorder is disclosed. The recorder employs an array of writing electrodes disposed laterally across a recording web. Analog input signals are applied to an analog-to-digital converter which includes a counter for converting the analog input signal into a coded binary output. The binary output is applied to a decoder matrix for selectively energizing a certain writing electrode corresponding to the amplitude of the analog input signal. The analog-to-digital converter also generates an output corresponding to the count in the counter. A comparator compares the signal to be recorded with the output signal of the analog-to-digital converter to derive an error signal for controlling the count in the counter such that the counter reaches a null balance at a count corresponding to the amplitude of the signal to be recorded. In a preferred embodiment, the counter circuit within the analog-to-digital converter is of the type which may count up or down to track changes of the input signal to be recorded, whereby a more rapid null balance is achieved and the high frequency response of the recorder is extended to higher frequencies.

Figures 1, 2:
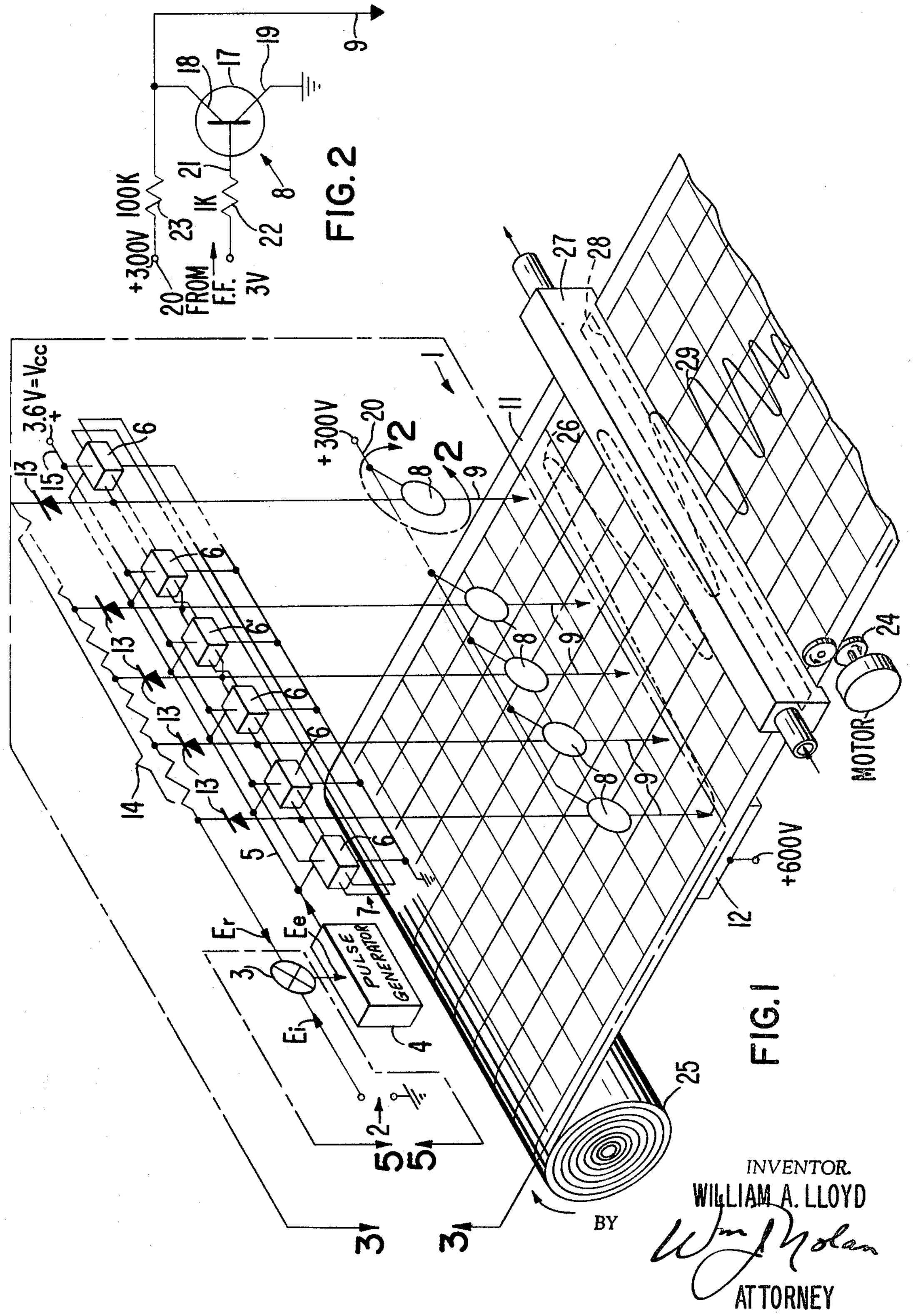

Heretofore, graphic recorders have employed moving writing means for writing on the recording web. Relatively low frequency response recorders typically use a motor driven ink fed pen, or a galvanometer movement, operating a writing stylus on a recording web. Relatively high frequency response recorders employ a galvanometer movement carrying a mirror for sweeping a light beam across a photosensitive recording web. Such recording galvanometers have attained a recorded frequency response on the order of tens of kHz. However, such high frequency response recording is limited to narrow recording widths because the maximum angular deflection of the mirror, at such high frequencies, is limited due to the inertia of the galvanometer and mirror assembly.

Electrographic recorders have been proposed using a stationary lateral array of writing electrodes which are either simultaneously or sequentially energized to write information on a moving recording web. In such recorders, the writing electrodes do not move and therefore the recorder frequency response is not limited by physical inertia of the writing means. Such recorders have been proposed as high speed, noiseless, alpha-numeric character printers for the output of high speed digital computers or calculators (U.S. 2,919,171, issued Dec. 29, 1959) and as a radar strip printer for printing the picture output of a radar (U.S. 3,076,968, issued Feb. 5, 1963).

The radar strip printer, while having high speed, is unsuited for analog strip chart recording because, in the radar picture printer, the radar output had to be time synchronized with the internal line sweep of the recorder. This is impractical for recording signals having unknown frequencies. On the other hand, the aforementioned high speed character printer patent (U.S. 2,919,171) mentioned that such printer could be used for plotting the values of variable data, provided that a "data quantizing means," not shown, was provided. However, there was no disclosure of any such "data quantizing means" nor in what manner the data was to be quantized. Typically, data to be recorded by a graphic recorder is in analog electrical form, whereas the aforementioned electrographic printers and recorders were adopted for operation with information in the proper digital form. Thus, they were unsuited for use as recorders of analog signals.

In the present invention, an electrographic recorder is provided which employs a lateral array of writing electrodes. The electrodes are selectively energised in response to an input signal in analog form to record the input signal on an electrographic recording web. An analog-to-digital converter, contained within the recorder, converts the analog input signal into a digital form for selectively energizing the proper writing electrodes to produce a faithful reproduction of the input signal. Such a recorder has a high frequency response since the writing means has no inertia. Moreover, the recording is not limited to narrow recorded widths as was found in the galvanometer recorders. Multichannel recording is easily obtained merely by time sharing the input of the recorder among a number of different quantities being recorded.

The principal object of the present invention is the provision of an improved graphic recorder.

One feature of the present invention is the provision of an analog-to-digital converter for converting an analog signal to be recorded into a digital form and for selectively energizing certain writing electrodes in an array of such electrodes for writing the signal to be recorded on an electrographic recording web, whereby no moving parts are required in the writing portion of the recorder, thereby providing a relatively high frequency response.

Another feature of the present invention is the same as the preceding feature wherein the analog-to-digital converter includes an electronic counter circuit for producing a reference signal proportional to the count in the counter to compare with the signal being recorded to produce an error signal which controls the count on the counter circuit for tracking changes in the input signal, whereby the precision of a null balance circuit is obtained with the speed of an electronic counter circuit.

Another feature of the present invention is the same as any one or more of the preceding features wherein the output of the analog-to-digital converter, upon a suitable dwell time, opens a selected gate circuit for applying the writing potential through the gate to the selected writing electrode of the array, whereby the analog-to-digital converter does not have to hold off the relatively high writing potential and whereby a signal is not recorded during the time the circuit is out of null balance.

Another feature of the present invention is the same as any one or more of the preceding features wherein the analog-to-digital converter includes a bidirectional counter for faster signal tracking speed.

Figure 3:
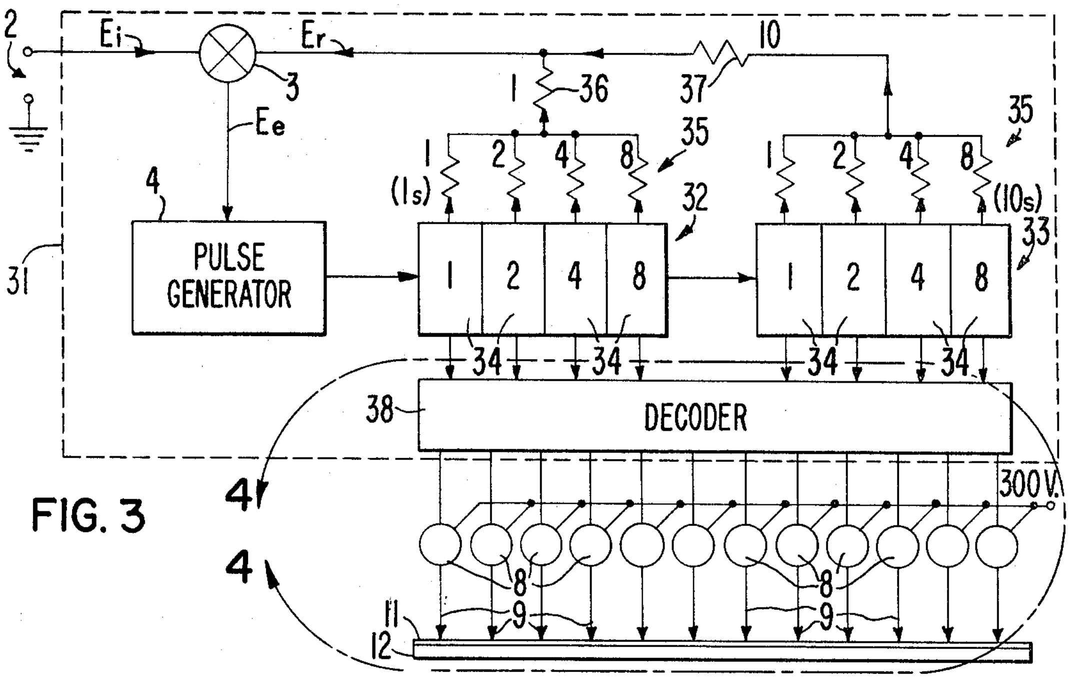
Figures 4, 5:
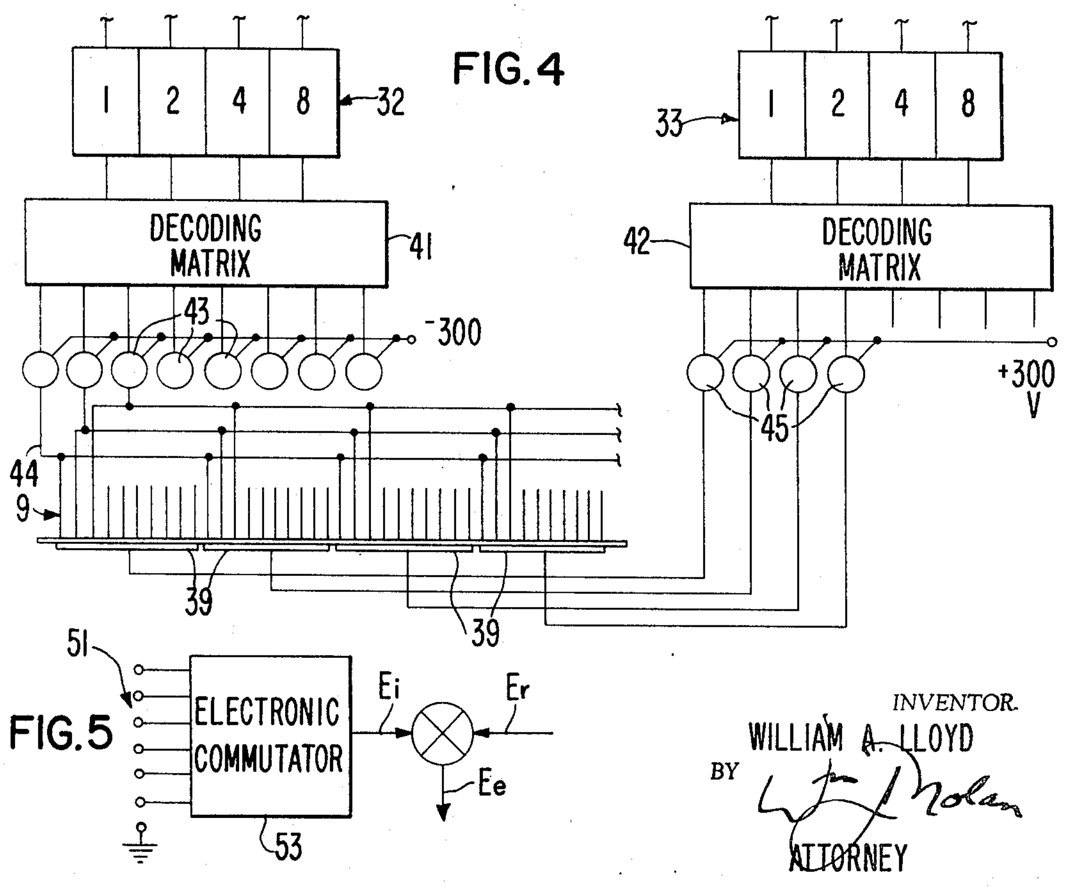

Other features and advantages of the present invention will become apparent upon a perusal of the following specification taken in connection with the accompanying drawings wherein:

FIG. 1 is a schematic perspective view of a graphic recorder incorporating features of the present invention, FIG. 2 is a detail circuit diagram of a portion of the circuit of FIG. 1 delineated by line 2—2 thereof, FIG. 3 is schematic circuit diagram of an alternative embodiment of that portion of the structure of FIG. 1 delineated by line 3—3, FIG. 4 is an alternative embodiment of that portion of FIG. 3 delineated by line 4—4, and FIG. 5 is an alternative embodiment of a portion of the structure of FIG. 1 delineated by line 5—5.

Referring now to FIG. 1, there is shown a graphic recorder 1 according to the present invention. The recorder includes a pair of input terminals 2 across which the signal E*i* to be recorder is applied. Typically, the signal is in analog form representing some change in a physical quantity being measured such as strain, temperature, pressure, electrical current, etc. The input signal is fed to one input of an error detector (comparator) 3 wherein the input signal is compared with a reference signal E*r* to obtain an error signal E*e* which is fed to a gate circuit within a pulse generator 4 for gating on and off or otherwise controlling a train of output pulses from the pulse generator 4.

The gated output pulses from the pulse generator 4, as for example 10 mHz., are applied via bus 5 to the control input terminals of an array of binaries 6 (flip-flops) connected in a closed loop to form a shift register or ring counter circuit 7. Suitable binaries include Fairchild model μL923 JK flip-flops. One of the binaries 6' is connected into the ring of binaries 6, as indicated by the crossed input and output leads, such that it will have an initially opposite output to all the other outputs. This opposite output can be made to travel around the ring circuit 7 by steps of one binary 6 with each input pulse from the pulse generator 4. The common outputs of the binaries 6 are each connected to separate gates 8 which gate a writing potential to an array of insulated writing electrodes 9. For the sake of explanation, only 5 of the writing electrodes 9 are depicted in the drawing. However, it is to be understood that in a practical high resolution recorder that the array could include at least 100 of such electrodes arranged in a linear array laterally extending across a recording web 11 onto which the input signal is to be recorded.

In a preferred embodiment, the gates 8 would be normally open such that a plus 300 volt potential would be applied to all the writing electrodes 9 except one, namely, the one coupled via gate 8 to the output of the binary 6 having the opposite output to all the other binaries 6. This opposite output binary would close its connected gate 8 to drop the potential applied to its controlled electrode 9 from plus 300 v. to ground potential.

A second writing electrode 12, in the form of a conductive plate, is disposed opposite the writting electrodes 9 and is preferably operated at a relatively high positive potential as of plus 600 v. relative to ground. The normally existing 300 volt difference between the writing electrodes 9 and the second electrode 12 is insufficient to produce electrostatic writing on the electrographic recording web 11. However, as to the 600 volt difference between the one grounded electrode 9 and the second writing electrode 12, this is sufficient to produce electrostatic writing by laying down a line of negative charge on the dielectric surface of the slightly conductive recording paper 11.

Thus, the point of writing on the recording web 11 can be made to shift laterally of the web 11 in accordance with electronic shifting of the one opposite output around the ring circuit 7. This is extremely significant because now the writing speed is not limited by inertia, drag, friction, etc. associated with a moving writing mechanism such as a pen drive and carriage or galvanometer movement. The writing speed is only limited by the time it takes to lay down a sufficient charge image to be devloped and by the time it takes to shift the output of the ring circuit 7.

A null balanced closed loop recorder circuit is obtained by tying the outputs of each of the binaries 6 through diodes 13 to successively higher resistance points in a resistor 14. A potential E*r* is taken from one end of the resistor 14 and fed to the reference input terminal of the error detector 3 for comparison with the input signal E*i* to produce a difference or error signal output E*e*. It is seen that the reference voltage E*r* varies in amplitude recording to the count (position of the output in the counter circuit 7). Thus, the count will stop or dwell at a point where null balance is obtained because the output E*e* of the error detector 3 shuts off the pulses from the pulse generator 4 at null balance.

The binary output voltage which is applied to the resistor 14 and to the gates 8, at the movable output point, is in the case of the aforementioned μL923 flip-flops about 3 volts. A collector supply voltage V*cc* is applied to the flip-flops 6 via bus 15. These flip-flops 6 have an operating frequency of 2 mHz.

In a preferred embodiment the ring circuit 7, pulse generator 4, error detector 3 and resistor 14 are connected for bidirectional counting or shifting such that the shifting output does not have to shift completely around the circuit 7 for a reversal of the writing direction. Thus, the bidirectional ring circuit 7 substantially increases the frequency of the input tracking recording response.

Referring now to FIG. 2 there is shown the gate circuit 8 in greater detail. The gate 8 includes a transistor 17 or other suitable device such as a silicon controlled rectifier with its collector electrode 18 connected to the writing electrode 9. Its emitter electrode 19 is connected to ground potential. The base electrode 21 is connected to the output of the binary 6, which is typically ground potential, through a 1KΩ resistor 22. A 100KΩ current limiting resistor 23 is connected between the collector electrode 18 and source of plus 300 v. writing bias such as bus 20. When the output writing voltage of about 3 volts is applied to the base electrode 21 from the ring circuit 7, the transistor 17 is biased to a conductive state causing the potential applied to the writing electrode 9 to drop from +300 volts to ground potential. The switching time of the transistor 17 is such that it is longer than the operating time of the binaries 6 such that unless the counter circuit 7 dwells, as obtained by a null balance, it will not trigger the transistor 17.

That portion of the recorder circuit 1 of FIG. 1 which includes the error detector 3, pulse generator 4, ring circuit 7 and resistor 14, as connected, is known in the art as an analog-to-digital converter. Any one of a number of such analog-to-digital converter circuits may be employed in the recorder of the present invention. Their function is to convert the analog input signal to be recorded into a digital form for applying the writing potential to the proper electrode of the array 9. Certain preferred forms of analog-to-digital converter circuits suitable for the recorder of the present invention, will be described below with regard to FIGS. 3 and 4.

In operation, the input signal applied to terminals 2 causes the writing electrodes 9 to produce a faithful trace of the input signal on the recording web 11. In the case of electrostatic writing on electrographic paper, such as that marketed by Crown Zellerbach and Plastic Coating Corporation, a charge image is deposited on a dielectric film surface of a slightly conductive backing paper. The electrode array 9 may be moved relative to the web 11, as in an X–Y recorder, not shown, or vice versa as in a strip chart recorder, as depicted.

In the case of an electrostatic strip chart recorder, the web 11 is drawn from a supply roll 25 between the writing electrodes 9 and the second electrode 12 by a motor driven friction wheel 24. The deposited signal charge image 26 is developed by drawing finely divided colloidally suspended pigment particles out of a dielectric fluid suspension of air or liquid toner to the charge image. In a preferred embodiment, the particles are in a dielectric liquid such as Shell Chemical Company's number 72 solvent. The developed image is fixed by drying of the moistened web 11.

The liquid developer (ink) is applied to the web 11 by means of a hollow inking channel 27 containing an inking slot 28 cut through the bottom side of the channel 27. Developer (toner) is fed into one end of the channel 27 from a reservoir, not shown, and drawn out the other end at less than atmospheric pressure by a pump, not shown. The reduced pressure on the inking slot 28 causes the web 11 to be pushed-up against the slot by the atmospheric pressure, thereby sealing the slot 28 and causing the ink to come into contact with the imaged portion of the web 11 to develop same at 29.

In case an electrosensitive recording web 11 is employed, a localized current flows into the web 11 from the electrodes 9. This current produces, in one type of paper, a burning away of an opaque coating to expose a contrasting underlay laminate portion of the paper. Thus, no subsequent development is necessary to produce a visible recorded image. In another type of electrosensitive recording web 11, the localized current produces, by electrolysis action, a discoloration of the paper, thereby producing a visible image of the signal being recorded.

Chart scale indices of time and amplitude may be electrographically printed on the web 11 at the same time as the recording is made, as described and claimed in copending U.S. application 578,801, filed Sept. 12, 1966, and U.S. application 578,542 filed Sept. 12, 1966, both assigned to the same assignee as the present invention. Alternatively, the recording web 11 may be pre-printed with such indices, as shown in the drawings.

Referring now to FIG. 3, there is shown an alternative analog-to-digital converter circuit portion to that shown in FIG. 1. In this embodiment, the analog-to-digital converter portion of the recorder circuit 31 is different than that of FIG. 1 and comprises a pair of binary decade counters 32 and 33 in place of the shift register or ring counter 7 of FIG. 1. Each of the decade counters 32 and 33 includes four binaries 34 connected to count 1, 2, 4 and 8, respectively. Thus, by different combinations of outputs of the binaries a count of 10 is obtainable in each decade counter 32 and 33. The outputs of the various binaries 34, for each decade counter, are added in adder circuits 35 which comprise parallel connected resistors having admittances which are proportioned in the ratio 1, 2, 4 and 8, respectively. The added outputs of each adder 35 are each fed through a resistor 36 and 37, respectively, which have their admittances proportioned in a 1 to 10 ratio, whereby the output of the first counter 32 is weighted to a value only one tenth that of the second counter 33. Thus, the output of the first counter is in terms of units and the second counter is in terms of 10's of units. The outputs of both counters $E_r$ are added in the error detector 3 and compared with the input signal $E_i$ to produce the error signal $E_e$ which controls the pulser 4, as previously described, for causing the counter to continue or discontinue its count. In a preferred embodiment the counters 32 and 33 are connected such that the count starts with on output of 9. If this is not sufficient to balance the input signal, the counter counts first by units of 10, i.e., 19, 29, 39, 49, etc., until the count overbalances the input and then the count is reversed and counts down by units of 1 until null balance is obtained. In this manner, a faster count is obtainable than if the counter counted by units of 1 until it reached a null balance.

The counters 32 and 33 also have a second output, the same as fed to the adders 35, which is fed to a decoder 38. The decoder 38, by a suitable and conventional matrix of diodes, combines the total of 8 outputs of the counters 32 and 33 into 100 separate outputs for selectively energizing the particular electrode 9 of the writing array which is dictated by the total count on the counters 32 and 33. The output of the decoder 38 is fed to the gates 8, as previously described with regard to FIG. 1.

Referring now to FIG. 4, there is shown an alternative embodiment to the decoding and writing electrode array of FIG. 3. In this embodiment, the array of writing electrodes 9 is separated into groups of 10 with all the same numbered electrodes 9 in each group being connected together, i.e., 1, 10, 20, 30, etc. Also, the second writing electrode 12 is similarly segmented into separately energizable segments 39 which are opposite each group of 10 writing electrodes 9. Each counter circuit 32 and 33 includes its own output decoder matrix 41 and 42. The "units" output of the first decoder 41 is fed to gate circuits 43 which energize the respective bus 44 interconnecting all the same numbered electrode of each group. However, the potential applied to the electrodes, via the gate 43, as of −300 volts, is insufficient taken alone to produce electrostatic writing. Concurrently, the output of the second decoding matrix 42 is applied to control the "unit of 10's" gates 45 for applying a second writing potential as of +300 volts to the proper decode segment 39. The combined −600 volts is sufficient to produce electrostatic writing on the web 11 at the particular electrode of the array 9 which corresponds to the combined output of the counter circuits 32 and 33. The advantage of the circuit of FIG. 4 is that it permits the electrode array 9 to form a portion of the decoder circuitry, thereby greatly reducing the complexity of the decoding circuits 41 and 42.

Referring now to FIG. 5 there is shown an alternative input circuit for the recorder of the present invention. More particularly, a multichannel recorder is obtained by including a plurality of separate sets of input terminals 51 together with a common ground terminal 52. An electronic commutator 53 sequentially monitors each of the input terminals and applies the respective signals to the error detector 3. The response time of the recorder is sufficiently fast such that, although the separate input signals are sequentially monitored and recorded, for practical purposes the separate signals appear to be simultaneously recorded.

Although the recorder of the present invention has been described as employing 100 pin type writing electrodes 9 this number is arbitrary and the array may include more or less than this number depending upon the desired resolution of the recording and the desired complexity of the recorder.

A recorder of the present invention will have a frequency response comparable to or better than the best available mirror type galvanometer recorders with much improved accuracy and providing wider recorded signal envelope heights.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an electrographic recorder apparatus; means forming an input terminal to which signals to be recorded are to be applied; means forming an array of insulated writing electrodes to be selectively energized with electrical writing potential for recording signals to be recorded on an electrographic recording medium disposed adjacent to said array of electrodes; means forming an electronic analog-to-digital converter for converting analog-type input signals to be recorded into digital form for selectively energizing said array of writing electrodes with the electrical writing potential; said analog-to-digital converter means including, an electronic counter circuit means for producing a reference signal having an amplitude proportional to the count in said counter circuit, and means for comparing the reference signal with the signal to be recorded to yield an error signal, the improvement comprising, means responsive to the error signal for controlling the count in said counter circuit, means to continue counting until the reference signal balances the input signal to produce a null balanced count at which time the counter dwells at the null balanced count, and circuit means responsive to the null balanced count in said counter circuit for selectively applying the writing potential to certain ones of said writing electrodes of said array for writing the signal to be recorded on the electrographic recording medium.

2. The apparatus of claim 1 wherein said counter circuit means includes, an array of binary devices, and a pulse generator for applying a train of pulses to said binary devices in response to the error signal for controlling the count in said counter circuit.

3. The apparatus of claim 2 wherein said array of binary devices is connected as a shift register.

4. The apparatus of claim 1 wherein said counter circuit means is connected for bidirectional counting, whereby faster tracking of changes in the input signal are obtained.

5. The apparatus of claim 1 wherein said circuit means for applying the writing potentials to said electrodes includes, means forming an array of electronic gates which are selectively opened for the writing potential to pass through to said selected ones of said writing electrode array in response to the output count of said counter circuit means, whereby said counter circuit means does not have to hold off the writing potential.

6. The apparatus of claim 1 including means for sequentially applying a plurality of input signals to be recorded to said input terminal in time displaced relation, such time displacement being sufficiently short such that for practical purposes the signals as recorded appear to be recorded essentially simultaneously.

References Cited

UNITED STATES PATENTS

| | | | |
|---|---|---|---|
| 2,796,314 | 6/1957 | Bishop et al. | 346—33 |
| 2,890,091 | 6/1959 | Curtis | 346—35 |
| 2,933,364 | 4/1960 | Campbell | 346—35 X |
| 2,967,082 | 1/1961 | Epstein | 346—33 |

RICHARD B. WILKINSON, *Primary Examiner.*

J. W. HARTARY, *Assistant Examiner.*